United States Patent
Subramania et al.

(10) Patent No.: US 8,509,985 B2
(45) Date of Patent: Aug. 13, 2013

(54) DETECTING ANOMALIES IN FAULT CODE SETTINGS AND ENHANCING SERVICE DOCUMENTS USING ANALYTICAL SYMPTOMS

(75) Inventors: Halasya Siva Subramania, Bangalore (IN); Satnam Singh, Bangalore (IN); Clifton L. Pinion, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 268 days.

(21) Appl. No.: 13/115,216

(22) Filed: May 25, 2011

(65) Prior Publication Data
US 2012/0303205 A1 Nov. 29, 2012

(51) Int. Cl.
*G06F 17/00* (2006.01)

(52) U.S. Cl.
USPC ....... 701/29.3; 701/29.7; 701/30.5; 701/32.1; 701/33.4; 701/33.5

(58) Field of Classification Search
USPC .................. 701/29.1, 29.3, 29.6, 29.8, 29.9, 701/30.5, 31.4, 31.6, 32.1, 32.7, 33.4, 33.5, 701/33.8, 33.9
See application file for complete search history.

(56) References Cited

U.S. PATENT DOCUMENTS

| 7,894,949 B2 * | 2/2011 | Stocker et al. ............... 701/32.7 |
| 2010/0138701 A1 * | 6/2010 | Costantino ....................... 714/49 |
| 2011/0238258 A1 * | 9/2011 | Singh et al. ..................... 701/33 |
| 2012/0296567 A1 * | 11/2012 | Breed ........................... 701/468 |

* cited by examiner

*Primary Examiner* — Richard M. Camby

(57) ABSTRACT

A method is provided for identifying a root cause of a fault in a serviced vehicle based on analytical symptoms. Parameter identification data associated with identified DTCs is retrieved. Parameter identification data from a plurality of vehicles experiencing the DTCs is collected. A first set of diagnostic rules is generated that identify vehicle operating parameters for executing a DTC algorithm or for triggering a DTC. A second set of diagnostic rules is generated that identify vehicle operating parameters used for selecting field failure data obtained when the DTC is triggered. Statistically significant rules are extracted from the second set of diagnostic rules. The first set of rules and the statistically significant rules are cooperatively applied to the parameter identification data for identifying a subset of the parameter identification data that represents anomalies. A subject matter expert analyzes the anomalies for identifying a root cause of the fault.

13 Claims, 5 Drawing Sheets

DETECTING ANOMALIES IN FAULT CODE SETTINGS AND ENHANCING SERVICE DOCUMENTS USING ANALYTICAL SYMPTOMS

BACKGROUND OF INVENTION

An embodiment relates generally to identifying anomalies in fault code settings and developing new analytical symptoms based on anomaly analysis to enhance service documents.

Diagnostic software algorithms utilize fault codes or diagnostic trouble codes (DTCs) for aiding technicians in servicing machinery, such as a vehicle at a service department at a dealership. Diagnostic trouble codes (DTCs) are triggered in the vehicle based on diagnostic software algorithms. A service diagnostic tool used by a service or similar retrieves DTCs from a vehicle processor memory that are used to determine the fault in a specific component of the vehicle. Each of the processors in the vehicle includes a memory that stores DTCs when the vehicle experiences an electrical fault. The service technician can review the current triggered DTC or a history of any DTCs for determining the root cause in the vehicle. DTCs are alphanumeric codes that are used to identify a fault that occurs in various components, circuits, or software within the vehicle. Such DTCs are related to various electrical vehicle functions that include, but are not limited to, engine operation, emissions, braking, powertrain, safety, and steering. Each subsystem may have its own on-board processor for monitoring faults of the subsystem operation or a processor may be responsible for monitoring faults for a plurality of subsystems. When the subsystem processor detects a fault, one or more DTCs are generated.

The DTCs assist the service personnel in pinpointing the area of concern. DTCs are retrieved by the service personnel with the aid of a scan tool. Although the DTC provides assistance to the service personnel in pinpointing the area of concern, the DTC does not provide definitive information as to what exactly caused the problem. Usually, a DTC indicates a fault either in a specific component, circuit connecting a component to the control module or in the control module itself. Now, it is still up to the technician to identify the root cause by performing further electrical circuit tests, utilize analytical reasoning, prior experience, or a best guess. Hence, DTCs provides diagnostics only up to certain extent. Additional diagnostic resolution could be obtained only by performing additional field tests and collecting additional operating parameter data from the vehicle. Sometimes, the algorithm generating the DTC may have an error or the calibrations specified in the algorithm are sensitive to vehicle operating conditions which results in triggering a false DTC. In addition, the DTCs may exhibit intermittent behavior which is difficult to fix due to absence of the operating parameters data under which intermittent DTCs were triggered. Intermittent behavior of faults is those instances when a fault is triggered and recorded; however, the fault conditions cannot be replicated at the service repair center.

The scan tool may further retrieve freeze frame operating parameter identifiers (PIDs) that are recorded when a specific DTC is triggered. A PID code is an operating parameter of a component or an output of a diagnostic algorithm that is recorded via the scan tool which is transmitted by reading from the communication bus of the vehicle. One of the devices on the communication bus recognizes the PID code for which it is responsible and returns information relating to the PID code for providing further details relating to one or more of the devices that sense data relating to the detected fault. However, the number of PIDs relating to a DTC may be quite numerous and burdensome to a service personnel having to analyze the PID codes.

In many instances errors are present in the DTC algorithm and DTCs will be triggered under inappropriate preconditions (e.g., conditions for triggering the DTC are improper). Moreover, calibrations may be sensitive based on operating conditions and the operating parameters require re-calibration. With the vast number of PID codes collected and analyzed, anomalies present in the DTC data can be identifiable with the help of statistical and data mining techniques. Anomalies are typically identified when analyzing warranty claim data. However, warranty data is only obtained after a vehicle is in production and claims have been made on the repair. As a result, a vast number of vehicles exhibiting the anomaly in DTCs may have been already serviced. What would be ideal is to identify an anomaly in the DTCs during the development stages or early production stages so that corrective actions can be made during the development stage or early production stage.

SUMMARY OF INVENTION

An advantage of an embodiment is the identification of anomalies in DTC settings. Anomalies may be detected during a development stage of a vehicle to minimize the number of warranty repairs when the vehicle enters production. The system uses rules based on the design documents and specifications as well as statistically significant rules via data mining of the field failure data to identify informative PIDs that are associated with the triggered DTC for detecting an anomaly. The anomaly may be the result of improper preconditions of the DTC or sensitive calibrations. As a result, analytical symptoms are identified and the root cause of the fault is determined by an off-vehicle process for enhancing service procedures. Adjustments to the component, software, or service documents are preferably made during the development stages of the vehicle or early in the production of the vehicle. Reduce no-trouble-found (NTF) rate by correcting the fault code (e.g. DTC) setting conditions instead of adding new fault codes.

An embodiment contemplates a method for identifying a root cause of a fault in a serviced vehicle based on anomalies identified in parameter identification data and performing corrective actions. A diagnostic software routine is executed for retrieving diagnostic trouble codes used to identify faults in an operation of the serviced vehicle. Parameter identification data associated with the diagnostic trouble codes identified with a detected fault is retrieved. Parameter identification data from a plurality of vehicles experiencing the diagnostic trouble codes is collected on a computer. A first set of diagnostic rules is generated. The first set of diagnostic rules identifies vehicle operating parameters for executing a diagnostic trouble code algorithm or for triggering a diagnostic trouble code. A second set of diagnostic rules is generated. The second set of diagnostic rules identifies vehicle operating parameters used for selecting field failure data obtained when the diagnostic trouble code is triggered. Statistically significant rules are extracted from the second set of diagnostic rules. Each of the first set of rules and the statistically significant rules are cooperatively applied to the parameter identification data for identifying a subset of the parameter identification data that represents anomalies. A subject matter expert analyzes the anomalies for identifying a root cause of the fault. Corrective actions are performed based on the identified root cause analysis.

DETAILED DESCRIPTION

Figure 1:
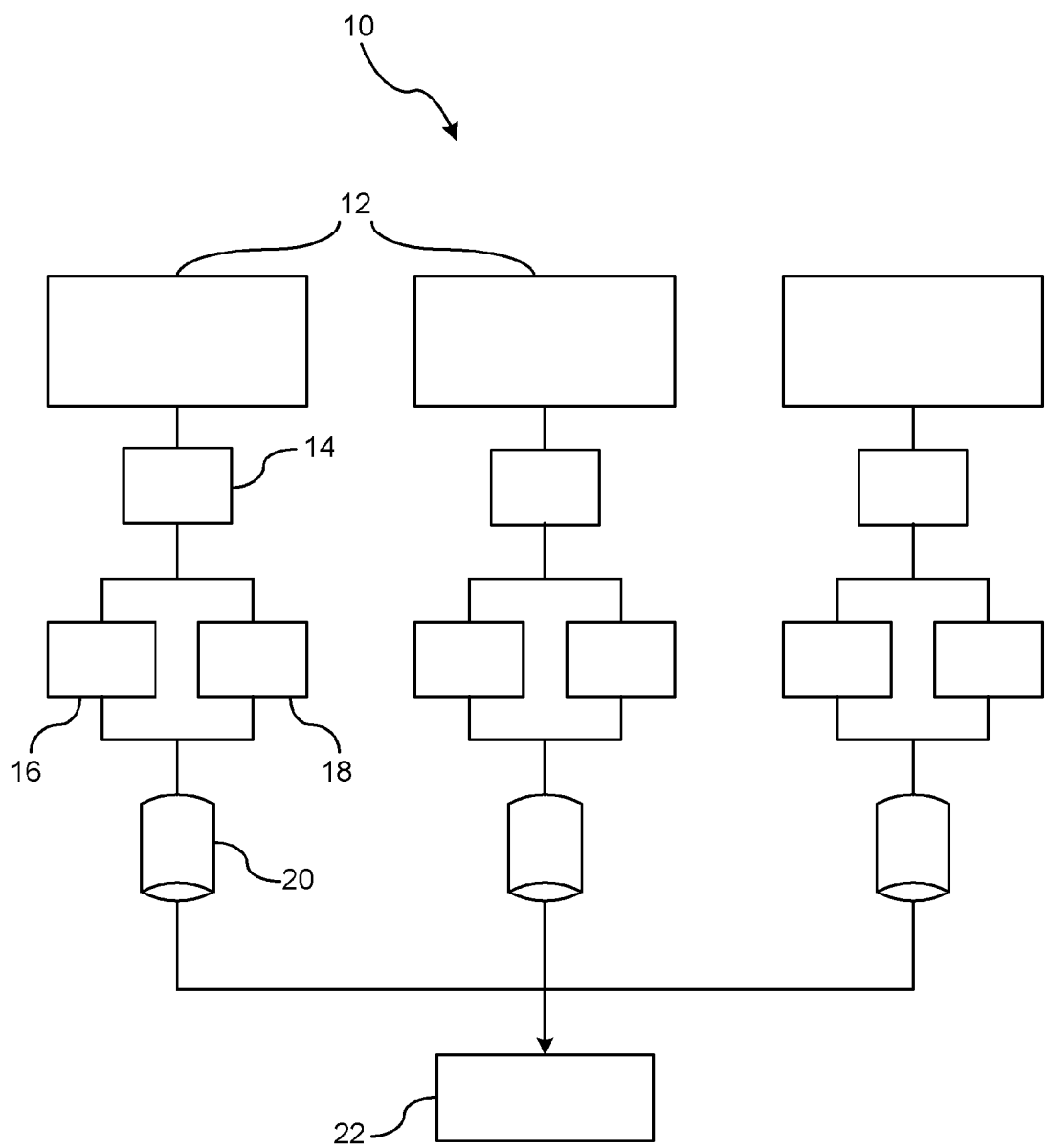
FIG. 1 is a block diagram of a diagnostic repair reporting system.

There is shown in FIG. 1 a diagnostic repair reporting system 10. The diagnostic repair reporting system 10 includes a plurality of service centers 12 for reporting diagnostic trouble codes (DTCs) obtained from servicing vehicles. It should also be understood that the data may be retrieved from fleet vehicles and test vehicles during both the development stages of the vehicle and early production stages of the vehicle. Obtaining DTC data and analyzing the DTC data for anomalies during the development stages or early production stages assist in reducing the number of service and warranty claims made on the vehicle.

To determine whether a misdiagnosis has occurred for a specific service repair, repair data is retrieved from the service shops. Original equipment manufacturers (OEMs), such as automotive companies, maintain an online repair reporting system. Moreover, OEMs collect data from test vehicles and fleet vehicles. In this example, the vehicles are brought to a service shop, such as a service department at a dealership. The technicians will run a diagnostic check on the vehicle using a scan tool 14 that communicates with one or more processors in the vehicle (e.g. engine control module). Each of the processors in the vehicle includes a memory or utilizes remote memory for storing DTCs 16 when the vehicle experiences a problem and an error code is recorded. Storing the DTCs 16 in the vehicle processor memory alleviates the service technician of trying to recapture the problem with the vehicle, particularly if the vehicle is not currently symptomatic of the problem; rather, the service technician can review the current or past history of any DTCs that have been stored in the memory of the vehicle for determining what issues were present with the vehicle when the problem occurred. DTCs 16 are alphanumeric codes that are used to identify a problem that occurs in various components in the vehicle. Such DTCs 16 may be related to various vehicle functions that include, but are not limited to, engine operation, emissions, braking, powertrain, and steering. Each subsystem may have its own on-board processor for monitoring faults of the subsystem operation or a processor may be responsible for monitoring faults for a plurality of subsystems. When the subsystem processor detects a fault, one or more DTCs 16 are generated. The DTCs 16 are stored in the processor's memory and are later retrieved by the service technician when tested. The DTCs 16 assist the service technician in pinpointing the area of concern.

To retrieve a DTC 16, the service technician enters a mode on the scan tool 14 requesting retrieval of DTCs 16 stored for a current or past driving cycle. However, the number of DTCs 16 is limited in a vehicle and finding the root cause becomes very difficult if several DTCs 16 are triggered simultaneously.

The scan tool 14 may also be used to retrieve the operating parameter identifiers (PIDs) 18 which are recorded at the time of DTC is triggered and recorded by the on-board processors. The health of the subsystems is typically monitored by a plurality (e.g., thousands) of operating PIDs 18 which is continuously collected using various sensors and diagnostic software routines contained in the on-board processors. The PIDs 18 are collected from freeze frame data, which is a set of limited number of instances when the DTC occurred.

The information in the PIDs 18 may include data concerning its operating condition (e.g., ratio of the air-fuel mixture is provided so that a determination may be made whether the ratio is within a minimum and maximum value). The DTCs 16 and PIDs 18 are collected and stored in a plurality of storage devices 20 which may be retrieved for later analysis.

An analysis tool 22 is in communication with the storage devices 20 for retrieving all or a portion of the service data containing the DTCs 16 and PIDs 18 of prior serviced vehicles to assist in identifying root causes of a current serviced vehicle. The analysis tool 22 may include a computer, laptop, handheld wireless processing device, or similar device that store data and execute the diagnostic routines as described herein.

Figure 2:
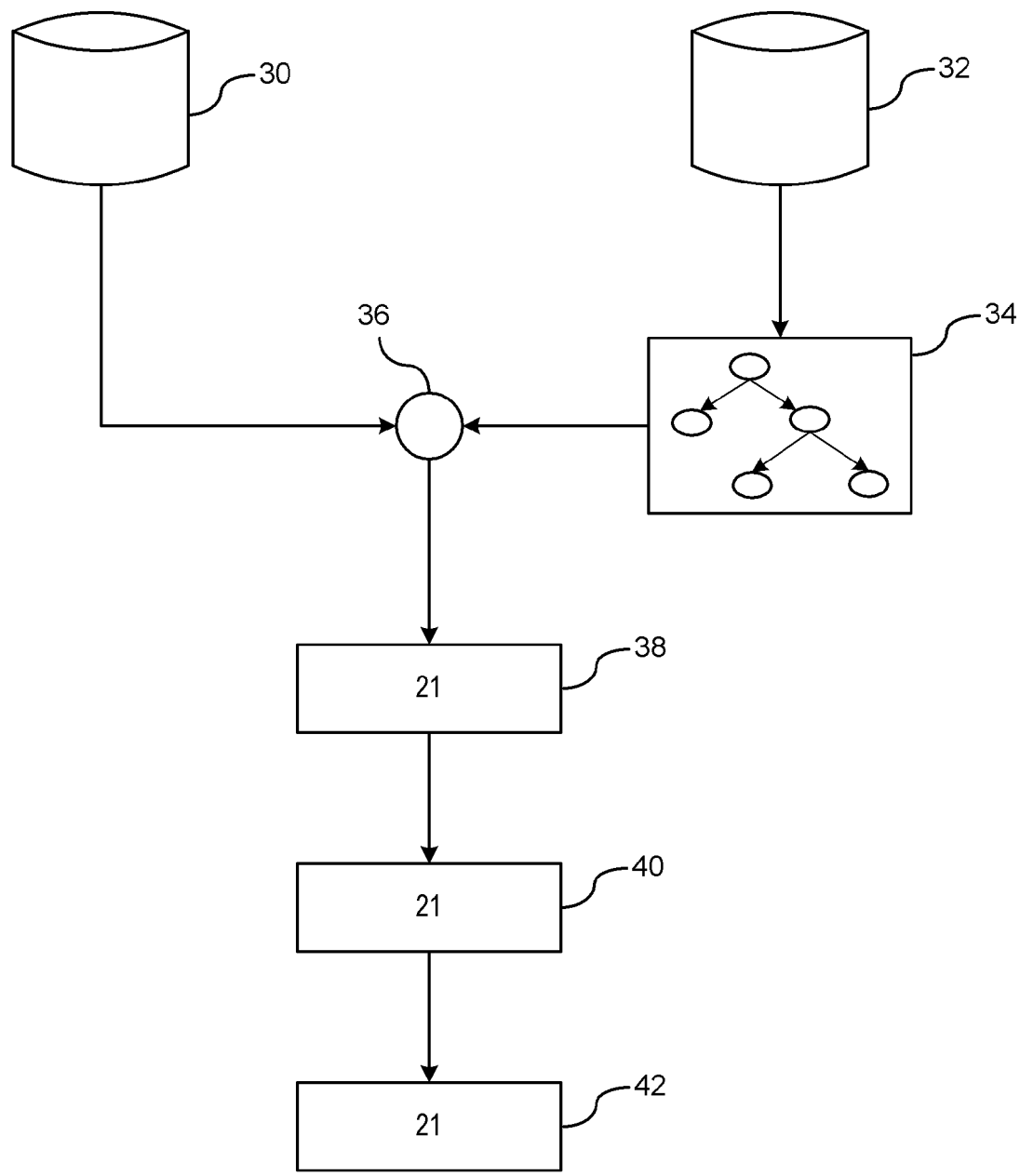
FIG. 2 is a block flow diagram for detecting anomalies from DTC and PIDs data.

FIG. 2 illustrates a block flow diagram for detecting anomalies from DTC and PID data. A design-related source 30 includes one or more databases and/or printed documents relating to design specifications and subject matter expert (SME) rules. The design specifications and SME rules may include service procedures, calibration documents, operating guidelines, engineering specifications, and other documentation that provide details as to the operating parameters of a component, circuit, algorithm, or other condition that relates to a DTC.

Rules are extracted from the design-related source 30 as it relates to a respective DTC may include rules for running a DTC, rules for triggering a DTC.

Exemplary rules for running a DTC, such as an exemplary evaporative emissions vent system, may include (1) ignition voltage between 11-18 volts; barometric pressure greater than 74 kPa; fuel level between 15-85%; engine coolant temperature less than 35° C. (95° F.); and intake air temperature between 4-30° C. (39-86° F.).

Examples of rules for setting the DTC may include (1) the fuel tank greater than 12 inches $H_2O$ vacuum for 5 seconds; and (2) fuel tank pressure less than −2.5 inches $H_2O$ or more than 5 inches for 60 seconds after a cold start.

A field failure data source 32 includes one or more databases or other memory storage devices that maintain field failure data. Examples of field failure data may include, but are not limited to, fault codes, freeze frame PID data, or warranty claims. Freeze frame PID data is a snapshot of operating parameters that is collected when a DTC is triggered. The PIDs indicate various operating conditions, such as, but not limited to, engine load, engine rpm, vehicle speed, voltage, current, temperature, and pressure that are retrieved by a service technician via a scan tool.

Rules are extracted from the field failure data source 32 utilizing a classifier or a decision tree 34. The classifier or decision tree 34 is used to automatically derive rules from the field failure data source 32 as it relates to the DTC. The classifier or decision tree 34 generates a rule for DTC classes based on a rule satisfying a portion of the PID data.

Data for constructing a decision tree is illustrated in the table shown below.

| PID1 | PID2 | PID3 | PID4 | DTCset |
|------|------|------|------|--------|
| 2 | 85 | 85 | 0 | DTC1 |
| 2 | 80 | 90 | 1 | DTC1 |
| 1 | 83 | 86 | 0 | DTC2 |
| 0 | 70 | 96 | 0 | DTC2 |
| 0 | 68 | 80 | 0 | DTC2 |
| 0 | 65 | 70 | 1 | DTC1 |
| 1 | 64 | 65 | 1 | DTC2 |
| 2 | 72 | 95 | 0 | DTC1 |
| 2 | 69 | 70 | 0 | DTC2 |
| 0 | 75 | 80 | 0 | DTC2 |
| 2 | 75 | 70 | 1 | DTC2 |
| 1 | 72 | 90 | 1 | DTC2 |
| 1 | 81 | 75 | 0 | DTC2 |
| 0 | 71 | 91 | 1 | DTC1 |

Figure 3:
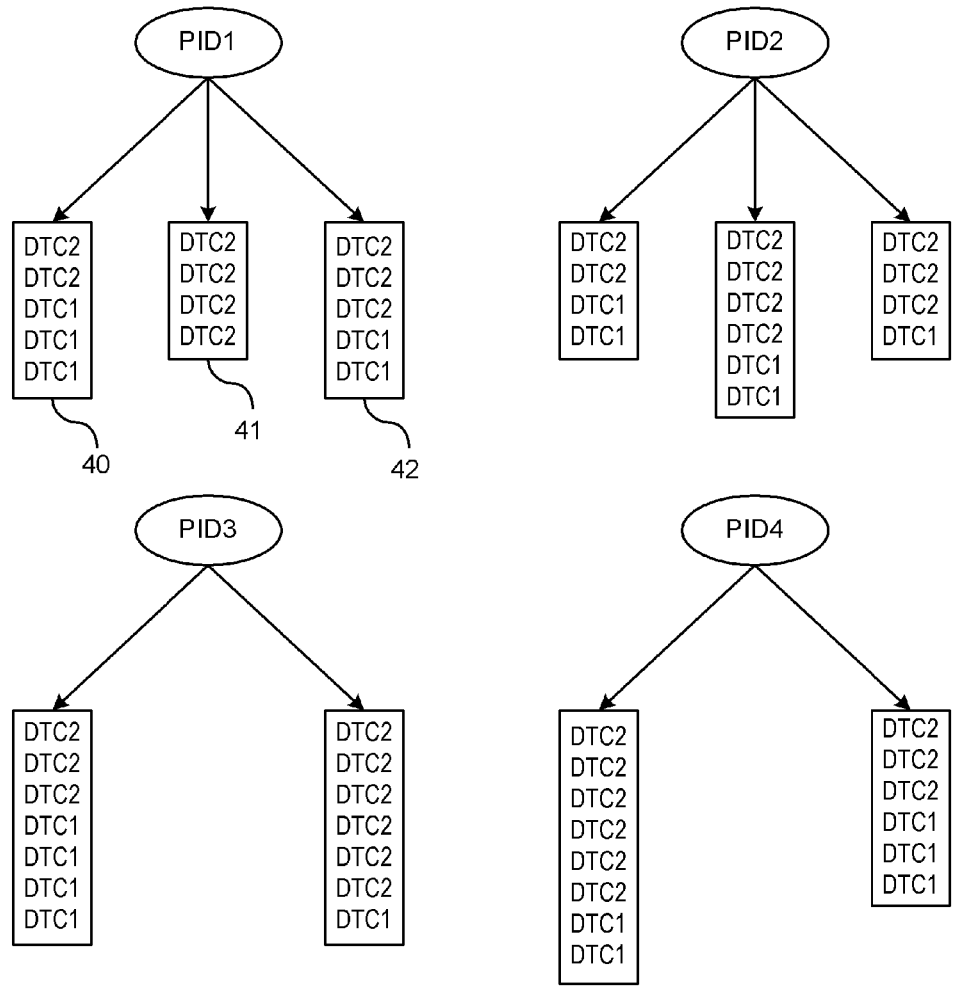
FIG. 3 illustrates exemplary datasets of input attributes for generating a decision tree.

Constructing the decision tree is expressed recursively. In the dataset given in the table, the PIDs are the input attributes and each record represents an example. There are two different DTC classes, "DTC1" and "DTC2". There are four input attributes, and therefore, there are four possibilities for each split and at the top level a tree is produced as illustrated in FIG. 3. The number of DTC1 classes and DTC2 classes are shown at the leaves of the tree 40, 41, 42. Any respective leaf with only one class (e.g., either DTC1 or DTC2) will not require further splitting, and therefore, the recursive process down that branch will terminate. Determining those respective classes that will not require further splitting are identified first. To determine which respective node leaf will require the least amount of splitting, a pseudo "purity measurement" is obtained which will obtain the attribute that produces the purest nodes. The measure of purity is labeled "information" and is measured in units of "bits". The bit represents the expected amount of information that would be needed to specify whether a new instance should be classified as a "yes" or a "no", provided that the example reached that node. Unlike the conventional definition of bits used in computer memory, an expected amount of information usually involves fractions of a bit and is typically less than one for the purpose described herein. The bit is calculated based on the number of DTC1 and DTC2 classes at the node.

When evaluating the first tree in FIG. 3, the numbers of DTC1 and DTC2 classes at the leaf nodes are [3,2], [0,4], and [2,3], respectively. For example in the first leaf 40, "3" represents the number of times DTC1 is present and "2" represents the number of times that DTC2 is present; in the second leaf 41, "0" represents the number of times DTC1 is present and "4" represents the number of times that DTC2 is present, in the third leaf 42, "2" represents the number of times DTC1 is present and "4" represents the number of times that DTC2 is present. The information values of these respective nodes are:

$$\text{Info}([3,2]) = -(3/5) \times \log(3/5) - (2/5) \times \log(2/5) = 0.971 \text{ bits};$$

$$\text{Info}([0,4]) = -(0/4) \times \log(0/4) - (4/4) \times \log(4/4) = 0.0 \text{ bits};$$

$$\text{Info}([2,3]) = -(2/5) \times \log(2/5) - (3/5) \times \log(3/5) = 0.971 \text{ bits}.$$

The average information value of these are calculated taking into account the number of instances that go down each branch (e.g., five down the first, four down the second, and five down the third). The average information is calculated as follows:

$$\text{Info}([3,2],[0,4],[2,3]) = (5/14) \times 0.971 + (4/14) \times 0.0 + (5/14) \times 0.971 = 0.693 \text{ bits}.$$

The average represents the amount of information that would be expected to specify the class of a new instance, given the tree structure for PID1. Prior to creating the tree structures in FIG. 3, training samples at the root comprised nine DTC2 nodes and five DTC1 nodes, corresponding to an information value of 0.940 bits. (i.e., Info([5,9])=0.940 bits). As a result of the first tree analyzed, information gain from the original root is represented by the following formula:

$$\text{gain(PID1)} = \text{info}([5,9]) - \text{info}([3,2],[0,4],[2,3]) = 0.940 - 0.693 = 0.247 \text{ bits}.$$

This is interpreted as the informational value of creating a branch on the input attribute PID1.

The information gain is then calculated for each attribute and the respective gain is selected that provides the most information to split on. For all the trees shown in FIG. 4, the gains of each tree were calculated as follows:

$$\text{gain(PID1)} = 0.247 \text{ bits}$$

$$\text{gain(PID2)} = 0.029 \text{ bits}$$

$$\text{gain(PID3)} = 0.152 \text{ bits}$$

$$\text{gain(PID4)} = 0.048 \text{ bits}$$

PID1 is selected as the splitting attribute at the root of the tree. The analysis is continued recursively. A further split on PID1 will produce no new results, so the other three attributes (i.e., PID1, PID2, PID3) are considered for splitting the left most branch of the top left part of PID1 in FIG. 4. The information gain for the new split is as follows:

$$\text{gain(PID2)} = 0.571 \text{ bits}$$

$$\text{gain(PID3)} = 0.971 \text{ bits}$$

$$\text{gain(PID4)} = 0.020 \text{ bits}$$

Figure 4:
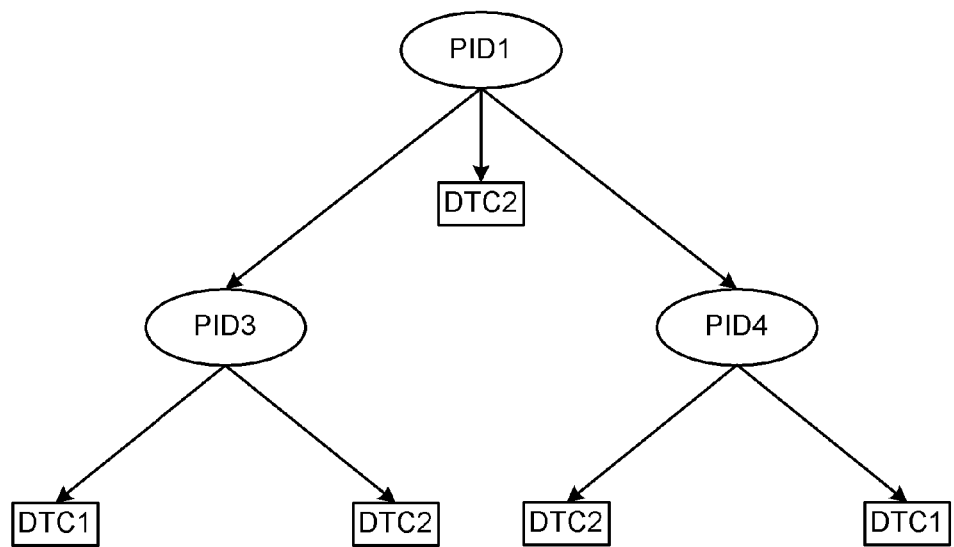
FIG. 4 is an exemplary illustration of a decision tree recursively generated.

In response to the gain information, PID3 is selected for spitting the attribute at this point. No further splitting was required from the branch, so this branch is complete. The technique is continued for the remaining branches. The final decision tree is shown in FIG. 4. It is noted that PID2 information was not as informative to classify PID2 as a dataset.

Referring again to FIG. 2, statistically significant rules are extracted from the rules obtained from the classifier or decision tree 34. A statistically significant rule is a rule that satisfies a predetermined portion of the parameter identification data. Two factors are considered to gain confidence with respect to the rule that is identified as statistically significant. The first factor is classification accuracy and the second factor is percentage of population.

In classification accuracy, a determination is made if the number of misclassified cases is below a classification threshold to indicate that the rule belongs to a particular class. If a particular rule classifies the number of incidents within a single class a predetermined percentage of the time correctly, then a first factor is satisfied. For example, a first triggered DTC has 60 instance occurrences and a second DTC has 40 instance occurrences, total 100 occurrences. When applying the rule to both DTCs, it is determined that the rule classifies sixty instances of the first DTC and six instances of the second DTC. A check is made to determine if the rule classifies the first DTC greater than a predetermined percentage of the time. The determination is represented by following formula:

$$\left(\frac{N_{DTC_1}}{N_{DTC_n}}\right) > \text{classification\_threshold}$$

where $N_{DTC_1}$ is the number of classified instances for $DTC_1$ identified using rule 1, $N_{DTC_n}$ is the number of classified instances of all DTCs identified using rule 1, and the classification_threshold is a predetermined percentage. Using the numbers from the above example and a threshold of 0.75, the determination is (60/66)>0.75 which holds true. As a result, the rule classifies this single DTC class greater than 75% of the time correctly which satisfies the first factor.

The second factor is whether rule satisfies a percentage of a population threshold. The percentage of population determines if the number of instances of a single DTC class as classified by the rule is significant in comparison to the total number of instances of that class. The determination of the second factor is represented by the following formula:

$$\left(\frac{N_{DTC_1}}{Nt}\right) > \text{population\_threshold}$$

where $N_{DTC_1}$ is the number of classified instances for $DTC_1$ identified using rule 1, Nt is the total number of all classified instances of all DTCs identified using all rules, and the population_threshold is a predetermined percentage. Using the numbers from the above example and a threshold of 0.5, the determination is (60/100)>0.5 which holds true. As a result, the second condition is satisfied. The extraction of statistically significant rules may utilize one or both of the factors, or may use other factors for identifying and extracting robust rules.

The extracted rules from the design-related source 30 and the statistically significant rules from the classifier or decision tree 34 are combined at block 36.

Figure 5:
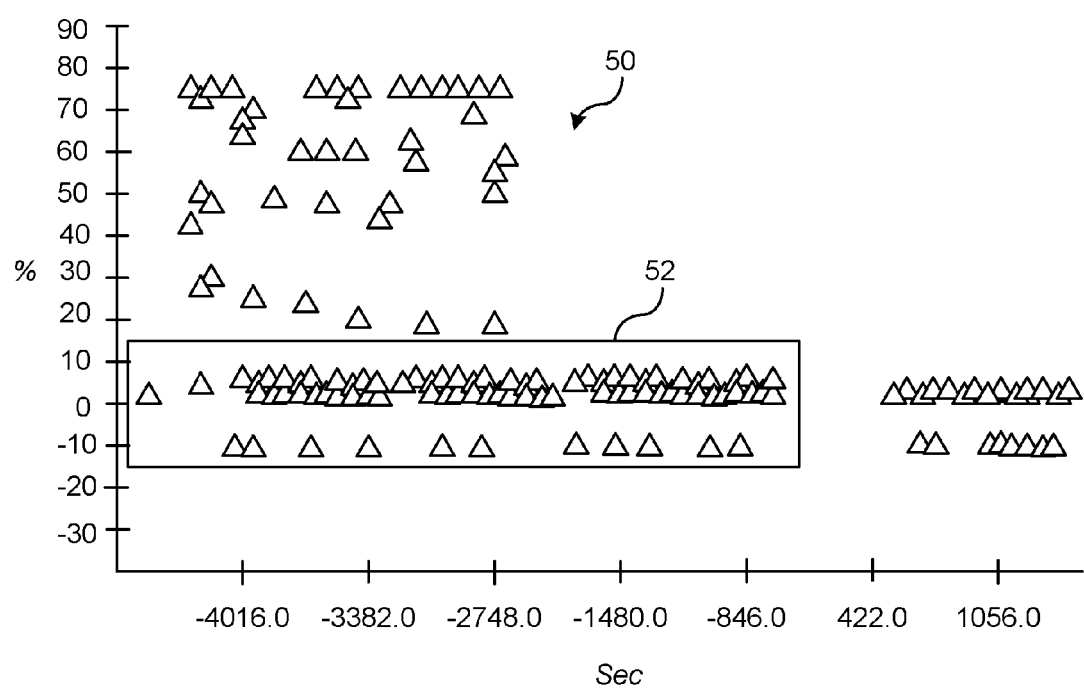
FIG. 5 is an exemplary graph subset parameter identification data identified by applying the statistically significant rules.

In block 38, the combined rules are cooperatively applied to the PIDs associated with the triggered DTC for identifying a subset of the PIDs. The identified subset satisfies each of the statistically significant rules. FIG. 5 shows a graph where a subset of the PIDs is identified by applying the statistically significant rules cooperatively. It should be understood that the inverse of the rules is what isolates and identifies the PIDs. For example, the first rule may be an EVAP system command purge that must be greater than 25%. Therefore, the routine isolates at PIDs where the EVAP system command purge is less than 25%. The second rule may be an EVAP system vapor pressure that must be greater than 0 Pa. Therefore, the routine isolates at PIDs where the EVAP vapor pressure is less than 0 Pa. A subset of PIDs 52 which represents candidate anomalies is identified as a result of the set of rules cooperatively applied to the PIDs 50.

Referring again to FIG. 2, in block 42, after the subset of PIDs is identified, the data is analyzed by SMEs to determine anomalies associated with the triggered DTC. Anamolies are detected by SME, other qualified personnel, or an automated system. The SMEs may categorize the DTC anomaly into two categories. The first category is an inappropriate precondition of the DTC category, and the second category is sensitive calibrations category.

For the inappropriate precondition of DTC category, the DTCs are triggered based on specific diagnostic algorithms which run under specific preconditions. An example is a DTC diagnosis algorithm for detecting a large leak in an EVAP system that is designed to run after a power up mode, but prior to a power down mode. In addition, other conditions must be present such as: the fuel level is between 15-85%, the engine coolant temperature is less than 35° C., and intake air temperature is 4-30° C. If there are errors in the DTC design algorithm, then the DTCs will be triggered under inappropriate preconditions. For example, if the DTC diagnostic algorithm is running when the engine is either in a power up mode or a power down mode, then it would inappropriate to trigger the DTC during these periods. Using the PID analysis described herein, the SMEs can target and identify inappropriate settings by analyzing the DTC anomalies.

Anomalies that involve sensitive calibrations occur when the DTC software has errors due to either improper implementation of the design conditions or some of the calibrations on the operating parameters are sensitive. For example, if flex fuel (ethanol-mix) vehicles that are designed to operate using a specific percentage of ethanol mixed fuel contains either a very low or very high percentage of ethanol, then the DTC may be triggered depending on a sensitivity with respect to the ethanol percentage in the fuel. Such types of sensitive calibrations could be identified by the isolating the DTCs using the technique described herein and analyzing the DTC anomalies. As a result, repairs that eventually get classified as trouble-not-identified (TNF) and subsequently are classified by adding a new fault code may be correctly classified to the respective fault code as identified by the technique described herein.

In block 44, corrective actions are performed to correct the issue causing the anomaly. The corrections may include design correction to a circuit, component, subsystem, system, or software program of the vehicle. Corrections may also be made to the diagnostic software that runs and executes the DTC. Moreover, corrections may be made to service repair procedures and other servicing training documentation that assist a technician in analyzing the problem and identifying the root cause of the fault. As a result, analytical symptoms are determined and analyzed based on identifying parameter identification data that does not satisfy the extracted rules. The symptoms are analytical/virtual in the sense that no additional hardware or software is added to the vehicle to detect the root cause of the fault. Rather, the identification of the anomaly and root cause of the fault is determined by an off-vehicle process.

While certain embodiments of the present invention have been described in detail, those familiar with the art to which this invention relates will recognize various alternative designs and embodiments for practicing the invention as defined by the following claims.

What is claimed is:

1. A method for identifying a root cause of a fault in a serviced vehicle based on anomalies identified in parameter identification data and performing corrective actions, the method comprising the steps of:

executing a diagnostic software routine for retrieving diagnostic trouble codes used to identify faults in an operation of the serviced vehicle;

retrieving parameter identification data associated with the diagnostic trouble codes identified with a detected fault;

collecting on a computer parameter identification data from a plurality of vehicles experiencing the diagnostic trouble codes;

generating a first set of diagnostic rules, the first set of diagnostic rules identifying vehicle operating parameters for executing a diagnostic trouble code algorithm or for triggering a diagnostic trouble code;

generating a second set of diagnostic rules, the second set of diagnostic rules identifying vehicle operating parameters used for selecting field failure data obtained when the diagnostic trouble code is triggered;

extracting statistically significant rules from the second set of diagnostic rules;

applying each of the first set of rules and the statistically significant rules cooperatively to the parameter identification data for identifying a subset of the parameter identification data that represents anomalies;

a subject matter expert analyzing the anomalies for identifying a root cause of the fault; and performing corrective actions based on the identified root cause analysis.

2. The method of claim 1 wherein the first set of diagnostic rules is derived from at least one design-related document source.

3. The method of claim 1 wherein the second set of diagnostic rules is derived from a classifier.

4. The method of claim 1 wherein the second set of diagnostic rules is derived from a decision tree.

5. The method of claim 1 wherein the statistically significant rules are extracted using a classification accuracy technique, wherein the classification accuracy technique determines if a respective rule classifies a number of incidents relating to a single DTC greater than a classification threshold.

6. The method of claim 5 wherein the determination for identifying whether a statistically significant rule satisfies a respective class is represented by the following equation:

$$\left(\frac{N_{DTC_1}}{N_{DTC_n}}\right) > \text{classification\_threshold}$$

where $N_{DTC_1}$ is the number of classified instances for $DTC_1$ identified using the respective rule, $N_{DTC_n}$ is the number of classified instances of all DTCs identified using the respective rule, and the classification_threshold is a predetermined percentage.

7. The method of claim 1 wherein the statistically significant rules are extracted using a population percentage technique, wherein the population percentage technique determines if a number of instances of a single diagnostic trouble code class as classified by a respective rule satisfies a population threshold in comparison to the total number of instances of diagnostic trouble code class.

8. The method of claim 7 wherein the determination for identifying whether a statistically significant rule satisfies a population threshold is represented by the following equation:

$$\left(\frac{N_{DTC_1}}{Nt}\right) > \text{population\_threshold}$$

where $N_{DTC_1}$ is the number of classified instances for $DTC_1$ identified using the statistically significant rule, Nt is the total number of all classified instances of all DTCs, and the population_threshold is a predetermined percentage.

9. The method of claim 1 wherein the step of performing a corrective action includes modifying at least one of the diagnostic software routine for assessing diagnostic trouble codes.

10. The method of claim 1 wherein the step of performing a corrective action includes revising a service document used to by a service technician for assessing the fault.

11. The method of claim 1 wherein the step of performing a corrective action includes modifying a diagnostic software routine for triggering the diagnostic trouble code.

12. The method of claim 1 wherein the step of performing a corrective action includes revising a component in the vehicle that relates to fault.

13. The method of claim 1 wherein the step of performing a corrective action includes modifying a system associated that relates to the fault.

\* \* \* \* \*